(12) United States Patent
Suzuki et al.

(10) Patent No.: US 10,239,133 B2
(45) Date of Patent: Mar. 26, 2019

(54) ROTATING TOOL

(71) Applicants: National University Corporation Nagoya University, Nagoya-shi (JP); MITSUBISHI MATERIALS CORPORATION, Tokyo (JP)

(72) Inventors: Norikazu Suzuki, Nagoya (JP); Jun Kitajima, Tokyo (JP)

(73) Assignees: National University Corporation Nagoya University, Nagoya-shi (JP); MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 15/561,648

(22) PCT Filed: Mar. 29, 2016

(86) PCT No.: PCT/JP2016/060183
§ 371 (c)(1),
(2) Date: Sep. 26, 2017

(87) PCT Pub. No.: WO2016/158980
PCT Pub. Date: Oct. 6, 2016

(65) Prior Publication Data
US 2018/0071840 A1 Mar. 15, 2018

(30) Foreign Application Priority Data
Mar. 30, 2015 (JP) .................................. 2015-070297

(51) Int. Cl.
*B23C 5/10* (2006.01)
*B23C 5/00* (2006.01)
*B23C 5/16* (2006.01)

(52) U.S. Cl.
CPC ................ *B23C 5/10* (2013.01); *B23C 5/006* (2013.01); *B23C 5/109* (2013.01); *B23C 5/165* (2013.01);
(Continued)

(58) Field of Classification Search
CPC B23C 5/006; B23C 5/10; B23C 5/018; B23C 5/1027; B23C 5/1063;
(Continued)

(56) References Cited

U.S. PATENT DOCUMENTS 2,645,003 A * 7/1953 Stanley .................... B23C 5/207
407/113
4,844,666 A * 7/1989 Tsujimura ............... B23C 5/003
407/34
(Continued)

FOREIGN PATENT DOCUMENTS

| JP | 11-333615 A | 12/1999 |
|---|---|---|
| JP | 2001-287752 A | 10/2001 |

(Continued)

OTHER PUBLICATIONS

International Search Report dated Sep. 13, 2016, issued for PCT/JP2016/068986 and English translation thereof.
(Continued)

*Primary Examiner* — Will Fridie, Jr.
(74) *Attorney, Agent, or Firm* — Locke Lord LLP

(57) ABSTRACT

A rotating tool includes a tool body which rotates around an axial line, four or more chip discharge grooves which are formed on an outer periphery of the tool body with gaps therebetween in a circumferential direction, and a plurality of cutting inserts which are arranged in multiple stages along the chip discharge grooves. In a cross-sectional view perpendicular to the axial line, when a center angle formed between a pair of virtual straight lines which connects each
(Continued)

of the cutting edges of the cutting inserts disposed in a pair of chip discharge grooves adjacent to each other in the circumferential direction and the axial line to each other is defined as an angle, a plurality of angles formed around the axial line include one maximum angle (θmax), one minimum angle (θmin), and two or more angles other than the angle (θmax) and the angle (θmin).

20 Claims, 8 Drawing Sheets

(52) U.S. Cl.
CPC .... *B23C 2210/282* (2013.01); *B23C 2210/40* (2013.01); *B23C 2210/486* (2013.01); *B23C 2250/16* (2013.01)

(58) Field of Classification Search
CPC ... B23C 5/1072; B23C 5/165; B23C 2210/40; B23C 2210/282; Y10T 407/1958; Y10T 407/1956; Y10T 407/196; Y10T 407/1962
See application file for complete search history.

(56) References Cited

U.S. PATENT DOCUMENTS

| | | | | |
|---|---|---|---|---|
| 5,083,887 | A * | 1/1992 | Dotany | B23C 5/109 407/48 |
| 5,947,649 | A * | 9/1999 | Arai | B23C 5/109 407/34 |
| 2005/0084341 | A1 | 4/2005 | Long et al. | |
| 2006/0280567 | A1 * | 12/2006 | Craig | B23C 5/109 407/113 |
| 2008/0050185 | A1 * | 2/2008 | Strouse | B23C 5/04 407/59 |
| 2009/0214304 | A1 * | 8/2009 | Waggle | B23C 5/003 407/42 |
| 2010/0003089 | A1 * | 1/2010 | Horiike | B23C 5/109 407/40 |
| 2010/0015431 | A1 | 1/2010 | Matsui et al. | |
| 2011/0123280 | A1 | 5/2011 | Hobohm | |
| 2011/0150583 | A1 | 6/2011 | Engstrom | |
| 2013/0028540 | A1 | 1/2013 | Matsumoto et al. | |
| 2013/0039705 | A1 * | 2/2013 | Fang | B23C 5/109 407/42 |

FOREIGN PATENT DOCUMENTS

| | | |
|---|---|---|
| JP | 2006-036272 A | 2/2006 |
| JP | 2009-280251 A | 12/2009 |
| JP | 2011-513074 A | 4/2011 |
| JP | 2011-098474 A | 5/2011 |
| JP | 2011-126008 A | 6/2011 |
| JP | 2011-521794 A | 7/2011 |
| JP | 2012-020394 A | 2/2012 |
| JP | 2015-030184 A | 2/2015 |
| JP | 2015-068484 A | 4/2015 |
| JP | 2015-209255 A | 11/2015 |
| WO | 2008/059925 A1 | 5/2008 |
| WO | 2009/075145 A1 | 6/2009 |
| WO | 2009/105408 A2 | 8/2009 |
| WO | 2011/132637 A1 | 10/2011 |
| WO | 2016/063961 A1 | 4/2016 |

OTHER PUBLICATIONS

International Search Report dated May 17, 2016, issued for PCT/JP2016/060183 and English translation thereof.

* cited by examiner

IV-IV

ROTATING TOOL

TECHNICAL FIELD

The present invention relates to a rotating tool such as an indexable end mill, for example.

Priority is claimed on Japanese Patent Application No. 2015-070297, filed on Mar. 30, 2015, the content of which is incorporated herein by reference.

BACKGROUND ART

In the related art, for example, as described in PTLs 1 and 2, a rotating tool such as an indexable end mill is known.

The indexable end mill includes a tool body which is formed in a columnar shape and rotates around an axial line and a cutting insert which is detachably mounted on a plurality of insert attachment seats formed on an outer periphery of the tool body and has a cutting edge protruding from the outer periphery of the tool body toward the outside in the radial direction.

A plurality of chip discharge grooves are formed on the outer periphery of the tool body with gaps therebetween in a circumferential direction, and the plurality of chip discharge grooves gradually extend toward a side opposite to a tool rotation direction around the axial line from a distal end toward a posterior end side in the direction of the axial line.

The plurality of insert attachment seats are arranged on wall surfaces of the chip discharge grooves facing the tool rotation direction with along the chip discharge grooves. The cutting insert is mounted on each of the insert attachment seats.

In this type of rotating tool, it is a common problem to prevent chattering vibrations caused by self-excited vibrations (resonance) during cutting.

In PTL 1, layout lines (that is, imaginary lines connecting predetermined points of cutting edges of respective cutting inserts forming rows along chip discharge grooves) of the cutting edges of the plurality of cutting inserts arranged in the chip discharge grooves are not constantly inclined but are nonuniformly inclined.

In PTL 2, as inclination patterns of layout lines of respective chip discharge grooves, two kinds of inclination patterns such as blade patterns A and B are provided.

In the rotating tool of the related art, self-excited vibrations generated during cutting are decreased and chattering vibrations are decreased by the above-described configurations.

CITATION LIST

Patent Literature

[PTL 1] Published Japanese Translation No. 2011-513074 of the PCT International Publication

[PTL 2] Japanese Unexamined Patent Application, First Publication No. 2012-20394

SUMMARY OF INVENTION

Technical Problem

However, in the rotating tools of the related art, there is room for improvement in sufficiently preventing chattering vibrations.

In PTL 1, the cutting edges of the plurality of cutting inserts disposed with gaps therebetween in the circumferential direction are disposed at an equal pitch (equally divided) in the circumferential direction. Accordingly, phase differences of regenerative vibrations of vibrations generated during machining are the same as each other between the cutting edges and self-excited vibrations easily occur.

In PTL 2, as the inclination patterns of the layout lines, only two kinds of inclination patterns are described. Accordingly, in the case where three or more chip discharge grooves are provided, a plurality of layout lines of the same inclination pattern exist, and thus, vibration suppression effects may not be easily obtained.

The present invention is made in consideration of the above-described circumstances, and an object thereof is to provide a rotating tool capable of remarkably reducing the occurrence of chattering vibrations by decreasing self-excited vibrations during cutting.

Solution to Problem (1) According to an aspect of the present invention, a rotating tool is provided, including: a tool body which is formed in a columnar shape and rotates around an axial line; a chip discharge groove which is formed on an outer periphery of the tool body and gradually extends toward a side opposite to a tool rotation direction around the axial line from a distal end of the tool body toward a posterior end side of the tool body; and a plurality of cutting inserts which include cutting edges protruding from the outer periphery of the tool body toward the outside in a radial direction and are arranged in multiple stages along the chip discharge groove on a wall surface of the chip discharge groove facing the tool rotation direction, in which at least four chip discharge grooves are provided on the outer periphery of the tool body with gaps therebetween in a circumferential direction, and in a cross-sectional view perpendicular to the axial line, when a center angle formed between a pair of virtual straight lines which connects each of the cutting edges of the cutting inserts disposed in a pair of chip discharge grooves adjacent to each other in the circumferential direction and the axial line to each other is defined as an angle θ, in at least the cross-sectional view in which first stage cutting inserts positioned on the most distal end side in the direction of the axial line among the plurality of cutting inserts arranged along the chip discharge grooves are shown and the cross-sectional view in which second stage cutting inserts adjacent to the posterior end sides of the first stage cutting inserts in the direction of the axial line are shown, a plurality of angles θ formed around the axial line include one maximum angle θmax, one minimum angle θmin, and two or more angles θ other than the angle θmax and the angle θmin.

In the rotating tool of the present invention, the one maximum angle θmax, the one minimum angle θmin, and the two or more angles θ other than the angle θmax and the angle θmin are included in at least all angles θ (angle θ1) formed around the axial line in the cross-sectional view (when viewed in the cross section perpendicular to the axial line of the tool body) in which cutting edges of the first stage cutting inserts positioned on the most distal end side in the direction of the axial line are shown and all angles θ (angle θ2) formed around the axial line in the cross-sectional view in which cutting edges of the second stage cutting inserts adjacent to the posterior end sides of the first stage cutting inserts in the direction of the axial line are shown.

In this way, in the cross-sectional view (in the stage of the cutting inserts) of the rotating tool, at least three angles θ having angles different from each other are provided. Accordingly, during cutting, it is possible to cause a phase difference of regenerative vibrations of vibrations generated during the machining by cutting edges of one cutting insert cutting into a work material to be different from a phase difference of regenerative vibrations of vibrations generated during the machining by cutting edges of other cutting inserts cutting into the work material, and thus, a specific phase difference is easily obtained.

That is, the phases of the regenerative vibrations of the respective cutting edges can be set to be different from each other. Accordingly, a value obtained by averaging regenerative vibration vectors can approximate zero. Therefore, it is possible to remarkably decrease self-excited vibrations during cutting.

Particularly, in the case where four or more chip discharge grooves are provided, the number of angles θ formed around the axial line is four or more, and thus, the number of angles increases. Accordingly, in the related art, from the viewpoint of ease of design, the angles θ are set to a common value.

In the present invention, the number of the angles θ shown in the same cross-sectional view is four or more. Accordingly, even when the number of the angles θ increases, in the present invention, a unique configuration is realized in which the angles θ are set to at least three kinds (θmax, θmin, and θ other than these) of values different from each other. Therefore, according to the present invention, remarkable vibration suppression effects are obtained.

As described above, according to the present invention, self-excited vibrations can be decreased during cutting, and thus, the occurrence of chattering vibrations is effectively decreased.

Accordingly, it is possible to stably maintain cutting with high accuracy, and a machining surface of a work material can stably have a high quality. Moreover, vibration suppression effects can be sufficiently obtained, and thus, it is possible to increase a machining speed of cutting and it is possible to improve machining efficiency.

(2) Preferably, in the cross-sectional view, all the plurality of angles θ formed around the axial line are different from each other.

In this case, the plurality of cutting inserts provided with gaps therebetween in the circumferential direction at the same position (the same stage) of the tool body in the direction of the axial line are disposed at unequal pitches (unequal division) in the circumferential direction, and all the cutting inserts are arranged at various angles θ having values different from each other.

Accordingly, during cutting, a phase difference of regenerative vibrations of vibrations generated during the machining by cutting edges of one cutting insert cutting into a work material is different from a phase difference of regenerative vibrations of vibrations generated during the machining by cutting edges of other cutting inserts cutting into the work material, and thus, a specific phase difference is easily obtained.

In this way, the phase differences of the regenerative vibrations generated at the respective cutting edges are set to be different from each other (that is, the phase differences are different from each other), and thus, a value obtained by averaging regenerative vibration vectors can approximate zero. Therefore, self-excited vibrations during cutting are remarkably decreased.

(3) Preferably, in at least the cross-sectional view in which the first stage cutting inserts are shown and the cross-sectional view in which the second stage cutting inserts are shown, all the plurality of angles θ formed around the axial line are different from each other.

In this case, the plurality of cutting inserts provided with gaps therebetween in the circumferential direction at the same position (the same stage) of the tool body in the direction of the axial line are disposed at unequal pitches (unequal division) in the circumferential direction, and all the cutting inserts are arranged at various angles θ having values different from each other. Furthermore, even if the respective angles θ (angle θ1 and angle θ2) of the first stage and the second stage are compared to each other, all the angles θ are set to values different from each other.

In this way, in the plurality of stages (the stages of the cutting inserts) in the direction of the axial line, all the angles θ are different from each other. Therefore, robustness properties can be effectively applied (robustness can be optimized). Accordingly, prevention effects of self-excited vibrations can be further expected.

(4) Preferably, in the cross-sectional view, the cutting inserts of three or more stages including one angle θmax, one angle θmin, and two or more angles θ other than the angle θmax and the angle θmin are provided in the direction of the axial line.

In this case, the above-described effects of the present invention are obtained over three or more stages of the cutting inserts, which is more remarkable.

(5) Preferably, the maximum angle θmax (angle θ1max) among the plurality of angles θ (angle θ1) formed around the axial line in the cross-sectional view in which the first stage cutting inserts are shown and the maximum angle θmax (angle θ2max) among the plurality of angles θ (angle θ2) formed around the axial line in the cross-sectional view in which the second stage cutting inserts are shown are disposed between the chip discharge grooves adjacent to each other in the circumferential direction.

(6) Preferably, the minimum angle θmin (angle θ1min) among the plurality of angles θ (angle θ1) formed around the axial line in the cross-sectional view in which the first stage cutting inserts are shown and the minimum angle θmin (angle θ2min) among the plurality of angles θ (angle θ2) formed around the axial line in the cross-sectional view in which the second stage cutting inserts are shown are disposed between the chip discharge grooves adjacent to each other in the circumferential direction.

In this case, the maximum angle θ1max in the cross-sectional view in which the first stage cutting inserts are shown and the maximum angle θ2max in the cross-sectional view in which the second stage cutting inserts are shown are disposed to each other between the same pair of (common) chip discharge grooves. Alternatively, the minimum angle θ1min in the cross-sectional view in which the first stage cutting inserts are shown and the minimum angle θ2min in the cross-sectional view in which the second stage cutting inserts are shown are disposed to each other between the same pair of (common) chip discharge grooves.

Accordingly, it is possible to prevent interference between the first stage cutting insert and the second stage cutting insert adjacent to each other in the chip discharge grooves.

That is, the maximum angle θ1max in the first stage and the maximum angle θ2max in the second stage become a value close to each other. Similarly, the minimum angle θ1min in the first stage and the minimum angle θ2min in the second stage become a value close to each other.

In this way, the angles θ having approximate magnitudes are disposed to be adjacent to each other in the extension direction of the chip discharge groove, and thus, leads (inclinations) of layout lines of the first and second stage cutting inserts arranged in the chip discharge groove are not greatly different from each other in each of the chip discharge grooves to be stabilized.

In addition, in the present specification, the "layout line" indicates an imaginary line (virtual helical winding line) which connects predetermined points (for example, distal ends of the cutting edges protruding from the outer periphery of the tool body in the direction of the axial line) of the cutting edges of each of the cutting inserts forming a row along the chip discharge groove.

In addition, the "lead" indicates a displacement amount in the direction of the axial line per unit angle along the axial line (or per unit length (circumferential length) in the circumferential direction). Specifically, when the outer periphery of the tool body is shown in a plane developed view (a horizontal axis indicates the circumferential direction and the vertical axis indicates the direction of the axial line), the "lead" corresponds to an "inclination" of the layout line.

Accordingly, it is possible to cause a gap between the first and second stage cutting inserts in the circumferential direction in each of the chip discharge grooves to be within a predetermined range. Therefore, it is possible to prevent the cutting inserts from being disposed to be extremely close to each other or away from each other in the circumferential direction.

Specifically, for example, if the gap between the first and second stage cutting inserts in the circumferential direction in the chip discharge groove decreases greatly, it is difficult to attach any one of the first and second stage cutting inserts to the tool body. In addition, even when the first and second stage cutting inserts can be attached to the tool body, there is a concern that chips generated by cutting of the second stage cutting inserts may interfere with the first stage cutting inserts.

In addition, if the gap between the first and second stage cutting inserts in the circumferential direction in the chip discharge groove increases greatly, a large step difference is formed between the first stage cutting insert and the second stage cutting insert, and thus, there is a concern that chip discharge performance may deteriorate.

According to the above-described configuration of the present invention, it is possible to remarkably prevent the problems.

(7) Preferably, in the cross-sectional view, the maximum angle θmax and the minimum angle θmin among the plurality of angles θ formed around the axial line are disposed to be adjacent to each other in the circumferential direction.

In this case, in the cross-sectional view in which the cutting inserts are shown, the maximum angle θmax and the minimum angle θmin among all the angles θ formed around the axial line are disposed to be adjacent to each other in the circumferential direction, and thus, (angle θmax+angle θmin)/2 which is an average value of the maximum angle θmax and the minimum angle θmin becomes a value approximate to other angles θ.

Therefore, it is possible to easily balance the rotation of the rotating tool. Specifically, it is possible to cause the center of gravity of the rotating tool to accord with the axial line which is the rotation center or dispose the center of gravity of the rotating tool to be close to the axial line.

Specifically, for example, unlike the above-described configuration, in the case where the second largest angle θ and the third largest angle θ are disposed to be adjacent to both sides of the angle θmax in the circumferential direction, the chip discharge grooves adjacent to each other in the circumferential direction are densely disposed in a region positioned on the side opposite to these in the circumferential direction. Therefore, it may be difficult to balance the rotation of the entire tool.

Moreover, in the case where the second smallest angle θ and the third smallest angle θ are disposed to be adjacent to both sides of the angle θmin in the circumferential direction, the gap between the chip discharge grooves adjacent to each other in the circumferential direction excessively increases in a region positioned on the side opposite to these in the circumferential direction. Accordingly, it may be difficult to balance the rotation of the entire tool.

According to the above-described configuration of the present invention, it is possible to remarkably prevent the problems.

(8) In the cross-sectional view, the minimum angle θmin and a second smallest angle θ may be respectively disposed to be adjacent to both sides of the maximum angle θmax in the circumferential direction among the plurality of angles θ formed around the axial line.

(9) In the cross-sectional view, the maximum angle θmax and a second largest angle θ may be respectively disposed to be adjacent to both sides of the minimum angle θmin in the circumferential direction among the plurality of angles θ formed around the axial line.

(10) In the cross-sectional view, the maximum angle θmax, the minimum angle θmin, the second largest angle θ, and the second smallest angle θ may be arranged around the axial line in this order.

In this case, the minimum angle θmin and a second smallest angle θ are arranged to both sides of the maximum angle θmax in the circumferential direction. Alternatively, the maximum angle θmax and a second largest angle θ are arranged to both sides of the minimum angle θmin in the circumferential direction. Alternatively, the maximum angle θmax, the minimum angle θmin, the second largest angle θ, and the second smallest angle θ are arranged around the axial line in this order.

Accordingly, the plurality of angles θ formed around the axial line are arranged to repeat large, small, large, and small in the circumferential direction. That is, large angles θ and small angles θ are alternately arranged.

Therefore, it is possible to easily balance the rotation of the rotating tool. Specifically, it is possible to cause the center of gravity of the rotating tool to accord with the axial line which is the rotation center or dispose the center of gravity of the rotating tool to be close to the axial line.

In addition, more preferably, the above-described alternating arrangement of the magnitudes of the angles θ is used in at least the first stage and the second stage, and the dispositions of the magnitudes in the circumferential direction in the first stage and the second stage correspond to each other.

That is, more preferably, the positions in the circumferential direction of the first stage angle θ max and the second stage angle θ max, the positions in the circumferential direction of the first stage angle θmin and the second stage angle θmin, the positions in the circumferential direction of the second largest angle θ in the first stage and the second largest angle θ in the second stage, and the positions in the circumferential direction of the second smallest angle θ in the first stage and the second smallest angle θ in the second stage correspond to each other, respectively.

Accordingly, it is possible to remarkably decrease interference between the first stage cutting inserts and the second stage cutting inserts while satisfactorily maintaining the rotation balance of the rotating tool.

In addition, the above-described dispositions of the angles θ (that is, the dispositions in different stages and the disposition in the same stage with respect to the angle θmax, the angle θmin, the second largest angle θ, the second smallest angle θ, or the like) can be applied to a plurality of stages including at least the first stage and the second stage.

Accordingly, effects of the above-described dispositions of the angles θ can be obtained over the plurality of stages including at least the first stage and the second stage.

(11) Preferably, a layout line of a plurality of cutting inserts arranged along a predetermined chip discharge groove among the plurality of chip discharge grooves is set to a fixed lead between the cutting inserts disposed after at least the second stage.

In this case, the layout line of the plurality of cutting inserts arranged along the predetermined chip discharge groove among the plurality of chip discharge grooves is formed to be set to the fixed lead between the cutting inserts disposed after at least the second stage. Accordingly, when the angles θ are set to the values different from each other over the plurality of stages as described above, in a state where the cutting inserts arranged in the predetermined chip discharge groove are set to a reference (a reference row), it is possible to easily dispose other cutting inserts.

In addition, the layout line of the plurality of cutting inserts arranged along the predetermined chip discharge groove may be formed to be set to the fixed lead between all the cutting inserts including the first stage cutting inserts.

Advantageous Effects of Invention

According to the rotating tool of the present invention, it is possible to remarkably reduce the occurrence of chattering vibrations by decreasing self-excited vibrations during cutting.

DESCRIPTION OF EMBODIMENTS

Figure 1:
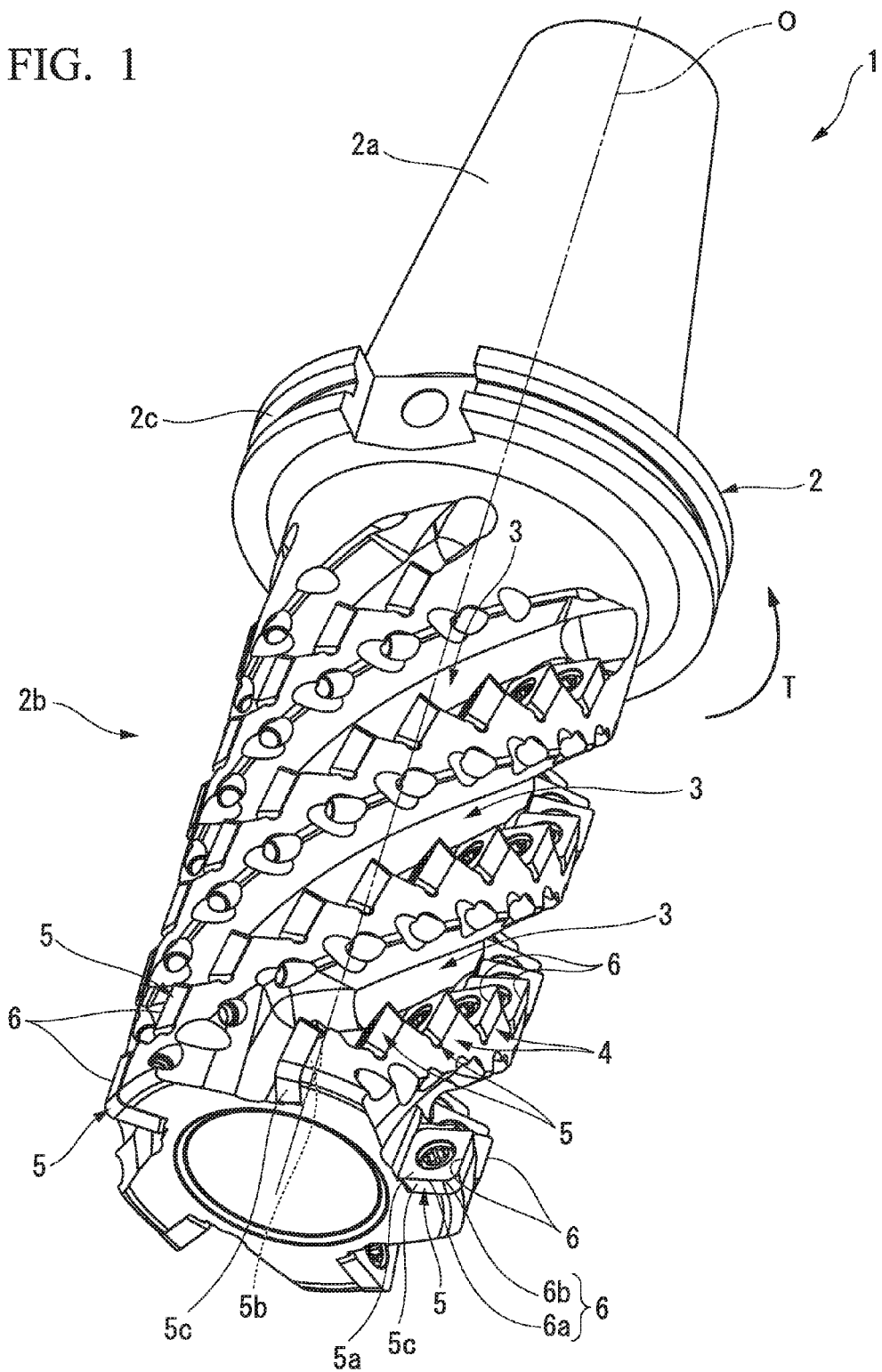
FIG. 1 is a perspective view showing an indexable end mill (rotating tool) according to an embodiment of the present invention.

Hereinafter, an indexable end mill (rotating tool) 1 according to an embodiment of the present invention will be described with reference to the drawings.

[Schematic Configuration of Indexable End Mill]

The indexable end mill 1 of the present embodiment is detachably mounted on a main shaft of a machine tool (not shown). The indexable end mill 1 is fed in a direction intersecting an axial line O while rotating around the axial line O, and thus, performs cutting (milling) such as grooving or shoulder machining on a work material such as a metal material.

As shown in FIGS. 1 to 4, the indexable end mill 1 includes a tool body 2 which is formed in a columnar shape and rotates around the axial line O, chip discharge grooves 3 which are formed on an outer periphery of the tool body 2 and gradually extend toward a side opposite to a tool rotation direction T around the axial line O from a distal end of the tool body 2 toward a posterior end side of the tool body 2, a plurality of insert attachment seat 4 which are arranged along each of the chip discharge grooves 3 on a wall surface of the chip discharge groove 3 facing the tool rotation direction T, and cutting inserts 5 which are detachably mounted on the insert attachment seats 4 and have cutting edges 6 protruding from the outer periphery of the tool body 2 toward the outside in the radial direction.

[Definition of Direction Used in Present Specification]

In the present specification, in the direction (up and down directions in FIG. 2) of the axial line O of the tool body 2, a direction (the lower side in FIG. 2) from a shank portion 2a mounted on a main shaft of the machine tool toward a cutting portion 2b cut into a work material is referred to as a distal end side, and a direction (upper side in FIG. 2) from the cutting portion 2b toward the shank portion 2a is referred to as a posterior end side.

In addition, a direction orthogonal to the axial line O is referred to as a radial direction, and in the radial direction, a direction approaching the axial line O is referred to as the inside in the radial direction, and a direction separated from the axial line O is referred to as the outside in the radial direction.

In addition, a direction around the axial line O is referred to a circumferential direction, and in the circumferential direction, a direction in which the tool body 2 is rotated by the main shaft during cutting is referred to a tool rotation direction T, and a rotation direction opposite to the tool rotation direction T is referred to a side (a direction opposite to the tool rotation direction) opposite to the tool rotation direction T.

[Tool Body]

The tool body 2 is formed of a steel material or the like and has an approximately columnar shape about the axial line O. In the tool body 2, a posterior end side portion attached to the main shaft of the machine tool becomes a shank portion 2a and a distal end side portion in which cutting inserts 5 are disposed becomes a cutting portion 2b.

In the shown example, a flange portion 2c having the largest diameter in the tool body 2 is formed on a distal end portion of the shank portion 2a adjacent to the cutting portion 2b. In addition, a diameter of the shank portion 2a gradually decreases from the flange portion 2c toward the posterior end side.

[Chip Discharge Groove]

The chip discharge grooves 3 extend while being gradually twisted in the circumferential direction from the distal end of the tool body 2 toward the posterior end side of the tool body 2. A plurality of chip discharge grooves 3 spirally extend on the outer periphery of the tool body 2 and are formed with gaps therebetween in the circumferential direction.

The number of the chip discharge grooves 3 provided on the outer periphery of the tool body 2 is at least four or more, and preferably, is six or less. However, seven or more chip discharge grooves 3 may be provided.

As shown in FIGS. 3A, 3B, 4A, and 4B, in the present embodiment, five chip discharge grooves 3 are provided on the outer periphery of the tool body 2 with gaps therebetween in the circumferential direction. That is, as the chip discharge grooves 3, "Flute 1" to "Flute 5" are provided.

The number of the chip discharge grooves 3 formed on the outer periphery of the tool body 2 may be an odd number or an even number. In addition, more preferably, the number of the chip discharge grooves 3 is an even number.

The distal end portion of the chip discharge groove 3 is open to the tip surface of the tool body 2. The posterior end portions of the chip discharge grooves 3 are cut upward to the outer periphery of the tool body 2 at the portion (the posterior end portion of the cutting portion 2b) adjacent to the distal end side of the flange portion 2c on the outer periphery of the tool body 2.

[Insert Attachment Seat]

A plurality of insert attachment seats 4 which are formed to be recessed to correspond to the shapes of the cutting inserts 5 are formed on the wall surface of the chip discharge groove 3 facing the tool rotation direction T. In the chip discharge groove 3, the plurality of insert attachment seats 4 are arranged in multiple stages in an extension direction of the chip discharge groove 3.

For example, each of the cutting inserts 5 is detachably mounted on the insert attachment seat 4 by a clamp screw. Accordingly, the cutting inserts 5 are arranged in the chip discharge groove 3 in multiple stages in the extension direction of the chip discharge groove 3.

[Cutting Insert]

The cutting insert 5 is made of a hard material such as cemented carbide and is formed in a polygonal plate shape. In the example shown in the present embodiment, the cutting insert 5 is formed in a quadrangular plate shape and is a single-sided type cutting insert.

However, the present invention is not limited to this, and for example, the cutting insert 5 may be a triangular plate shape or a polygonal plate shape having a pentagonal or more shape, or may be a double-sided type (front and back inversion symmetrical shaped) cutting insert.

As shown in FIG. 1, the cutting insert 5 includes a pair of polygonal surfaces 5a and 5b which intersects an insert axial line (an axial line which passes through each of the centers of the front and rear surfaces of the cutting insert 5) (not shown) and an outer peripheral surface 5c which connects the peripheral edges of the polygonal surfaces 5a and 5b to each other.

In addition, in the present specification, the "pair of polygonal surfaces 5a and 5b which intersects an insert axial line" is not limited to a configuration in which the insert axial line directly intersects the polygonal surfaces 5a and 5b.

For example, like the present embodiment, the "pair of polygonal surfaces 5a and 5b which intersects an insert axial line" includes a configuration in which the insert axial line passes through the centers (virtual centers) of the polygonal surfaces 5a and 5b in a state where the insert axial line is positioned in a through-hole (holes into which the clamp screw is inserted) which opens to the pair of polygonal surfaces 5a and 5b.

In addition, the outer peripheral surface 5c connects the peripheral edges of the pair of polygonal surfaces 5a and 5b to each other in the direction of the insert axial line.

Figure 2:
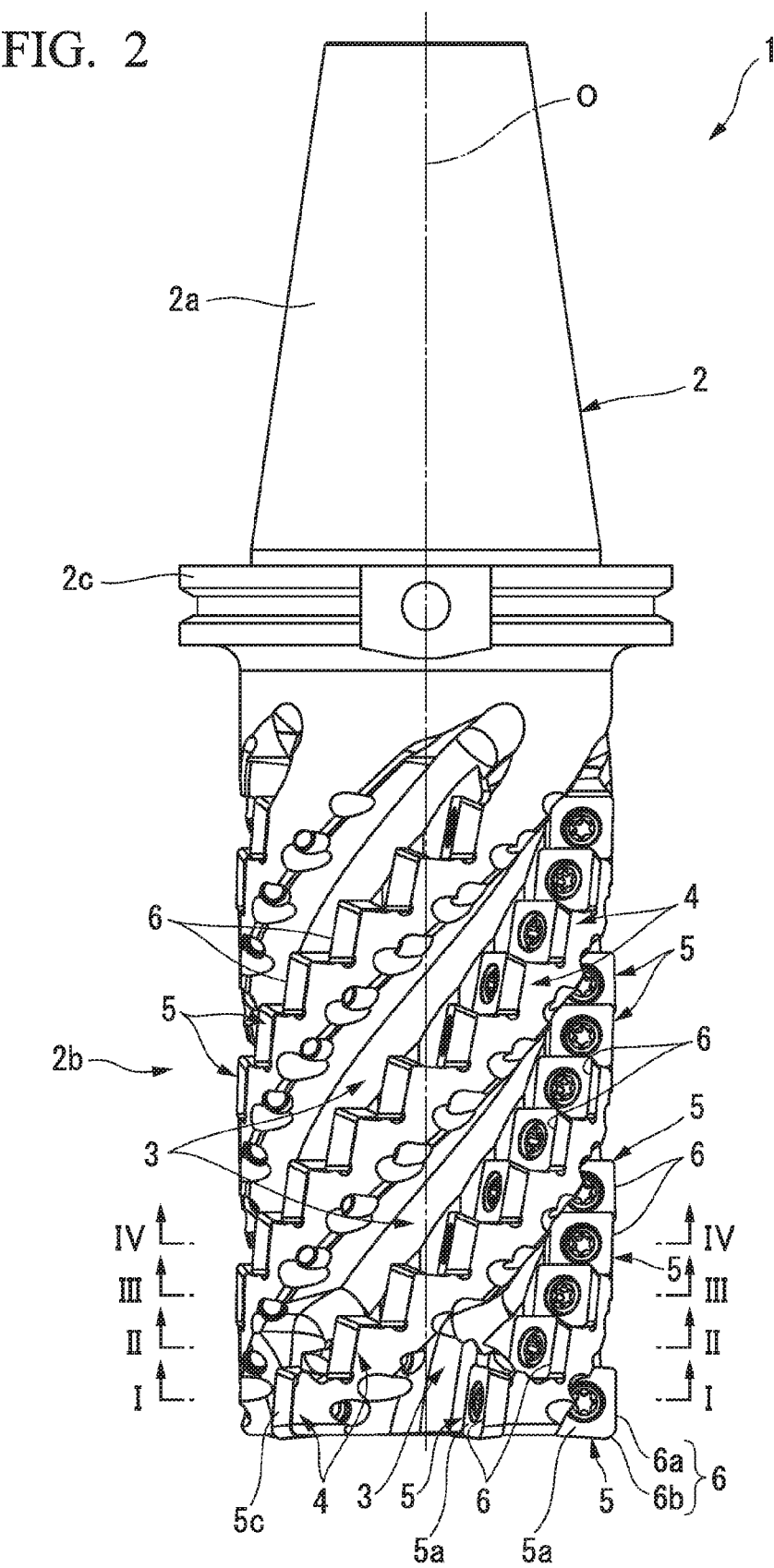
FIG. 2 is a side view showing the indexable end mill according to the embodiment of the present invention.

As shown in FIGS. 1 and 2, in a state where the cutting insert 5 is mounted on the insert attachment seat 4 of the tool body 2, one polygonal surface 5a of the pair of polygonal surfaces 5a and 5b faces the tool rotation direction T.

In addition, in the state where the cutting insert 5 is mounted on the insert attachment seat 4 of the tool body 2, in the pair of polygonal surfaces 5a and 5b, the other polygonal surface 5b having a smaller area than that of one polygonal surface 5a is placed on the insert attachment seat 4 in a state of facing the side opposite to the tool rotation direction T.

A plurality of cutting edges 6 are formed on the peripheral edges of the one polygonal surface 5a facing the tool rotation direction T along the peripheral edges. Specifically, in the cutting insert 5, an intersection ridge line between the one polygonal surface 5a and the outer peripheral surface 5c becomes the cutting edge 6.

In the present embodiment, the cutting insert 5 is formed in a quadrangular plate shape, and thus, four pairs of side portions and corner portions are formed on the peripheral edge of the one polygonal surface 5a. Accordingly, four cutting edges 6 are formed along the peripheral edges of the one polygonal surface 5a so as to correspond to the outer shape of the one polygonal surface 5a.

The cutting edge 6 includes linear cutting edges 6a which are linearly formed along the side portions of the one polygonal surface 5a and protruding curved corner cutting edges 6b which smoothly connect the linear cutting edges 6a of the adjacent cutting edges 6 to each other.

In addition, the corner cutting edge 6b is not limited to a protruding curved shape. For example, after the corner cutting edge is formed in a short linear shape, the corner cutting edge may intersect the adjacent linear cutting edge 6a so as to form an obtuse angle therebetween.

In addition, in a state where the corner cutting edges 6b are not provided, the adjacent linear cutting edges 6a of the cutting edge 6 may be directly connected to each other.

In the cutting insert 5, among the plurality of cutting edges 6, predetermined cutting edges 6 (more specifically, at least the linear cutting edges 6a of the predetermined cutting edges 6) are mounted on the insert attachment seat 4 so as to protrude from the outer periphery of the tool body 2 toward the outside in the radial direction.

In addition, among the plurality of cutting inserts 5 arranged in the chip discharge groove 3, in the cutting insert 5 mounted on the first stage insert attachment seat 4 positioned on the most distal end side of the tool body 2, the predetermined cutting edges 6 protrude from the outer periphery of the tool body 2 toward the outside in the radial direction and are disposed such that cutting edges 6 different from the predetermined cutting edges 6 protrude from the tip surface of the tool body 2 toward the distal end side.

The cutting inserts 5 are mounted on the insert attachment seats 4 as described above. Accordingly, in all cutting inserts 5, the linear cutting edges 6a of the cutting edges 6 protruding from the outer peripheral surfaces 5c of the tool body 2 toward the outside in the radial direction become an outer peripheral cutting edge of the indexable end mill 1.

In addition, in the cutting inserts 5 disposed on the distal end of the tool body 2, the linear cutting edges 6a of the cutting edges 6 protruding from the tip surface of the tool body 2 toward the distal end side become an end cutting edge (tip cutting edge) of the indexable end mill 1.

Moreover, in the cutting inserts 5 disposed on the distal end of the tool body 2, the corner cutting edges 6b of the cutting edges 6 protruding from the outer peripheral portions of a tip of the tool body 2 become a corner cutting edge of the indexable end mill 1.

In a state where the cutting insert 5 is mounted on the insert attachment seat 4, the outer peripheral cutting edge (the cutting edge 6 protruding from the outer periphery of the tool body 2 toward the outside in the radial direction) of the cutting insert 5 extends to be gradually inclined toward the side opposite to the tool rotation direction T from the distal end of the tool body 2 toward the posterior end side of the tool body 2.

That is, a helix angle of a positive angle is provided on the outer peripheral cutting edge of each of the cutting inserts 5.

In the present specification, in the outer peripheral cutting edges (cutting edges 6) of the cutting insert 5, the "helix angle" indicates an acute angle among acute angles and obtuse angles formed between the axial line O (or a straight line parallel to the axial line O) and the outer peripheral cutting edge (the cutting edge 6, corresponding to helical winding line of twist) of the cutting insert 5 in a side view (in a side view when the tool body 2 is viewed in a radial direction orthogonal to the axial line O, and for example, refer to FIG. 2) of the tool body 2 when a flank face (the portion of the outer peripheral surface 5*c* adjacent to the outer peripheral cutting edge) adjacent to the outer peripheral cutting edge is viewed from the front.

In addition, in the example of the present embodiment, the one polygonal surface 5*a* of the cutting insert 5 is approximately one plane and the outer peripheral cutting edges (cutting edges 6) are positioned inside the plane. Accordingly, the helix angle corresponds to an axial rake angle (rake angle in axial direction).

In the present embodiment, when the cutting insert 5 is mounted on each of the plurality of insert attachment seats 4, the insert attachment seats 4 are formed such that the helix angles of the outer peripheral cutting edges (cutting edges 6) of the cutting inserts 5 are the same as each other.

Moreover, when the cutting insert 5 is mounted on each of the plurality of insert attachment seats 4, the insert attachment seats 4 are formed such that radial rake angles (outer peripheral rake angles) of the outer peripheral cutting edges (cutting edges 6) of the cutting inserts 5 are the same as each other.

In the present specification, for example, the "radial rake angle of the outer peripheral cutting edge" indicates, in a cross-sectional view (viewed from a cross section perpendicular to the axial line O of the tool body 2) of the indexable end mill 1 shown in FIGS. 3A, 3B, 4A, and 4B, an acute angle among acute angles and obtuse angles which are formed between in a predetermined radial direction (corresponding to a so-called "reference surface") passing through the outer peripheral cutting edge (the cutting edge 6) among radial directions orthogonal to the axial line O and a rake face (the portion of the one polygonal surface 5*a* adjacent to the outer peripheral cutting edge) of the outer peripheral cutting edge.

In the present embodiment, the radial rake angle of the outer peripheral cutting edge of each of the cutting inserts 5 becomes 0°.

However, the present invention is not limited to this, and the radial rake angle of the outer peripheral cutting edge of the cutting insert 5 may be a positive angle and may be a negative angle other than 0°.

As shown in FIGS. 1 and 2, the cutting inserts 5 which are arranged to be mounted on the plurality of insert attachment seats 4 inside the chip discharge grooves 3 are disposed at equal pitches (equal gaps) in the direction of the axial line O. Moreover, the cutting inserts 5 are disposed at approximately unequal pitches (unequal gaps) in the circumferential direction. However, the cutting inserts 5 may include cutting inserts having the same pitch (disposition gap).

In the present embodiment, twelve (first to twelfth stage) cutting inserts 5 are arranged in each of the chip discharge grooves 3.

In addition, in each chip discharge groove 3, the cutting inserts 5 from the first stage cutting inserts 5 positioned on the most distal end side to the fourth stage cutting inserts 5 toward the posterior end side are arranged at unequal pitches to each other in the circumferential direction.

Moreover, the pitches in the circumferential direction of the cutting inserts 5 from the fifth stage cutting inserts 5 to the eighth stage cutting inserts 5 and the pitches in the circumferential direction of the cutting inserts 5 from the ninth stage cutting inserts 5 to the twelfth stage cutting inserts 5 are arranged such that unequal pitches similarly to the pitches in the circumferential direction from the first stage cutting inserts 5 to the fourth stage cutting inserts 5, respectively.

That is, the unequal pitches of the first to fourth stage cutting inserts 5 are repeated in each of the fifth to eighth stage cutting inserts 5 and the ninth to twelfth stage cutting inserts 5.

In addition, in the present embodiment, among the plurality of chip discharge grooves 3 provided on the outer periphery of the tool body 2, the layout line of the plurality of cutting inserts 5 arranged along a predetermined chip discharge groove 3 (specifically, Flute 5 shown in FIGS. 3 to 5) is set to a fixed lead between the cutting inserts 5 disposed after at least the second stage.

Specifically, in the example shown in FIGS. 1 to 4 of the present embodiment, the layout line of the plurality of cutting inserts 5 arranged along the predetermined chip discharge groove 3 (Flute 5) is set to the fixed lead between the cutting inserts 5 disposed after the second stage (that is, in the second to twelfth stages). That is, among the layout lines of the plurality of cutting inserts 5 arranged along the predetermined chip discharge groove 3 (Flute 5), the layout lines after the second stage are set to the fixed lead.

Figure 5:
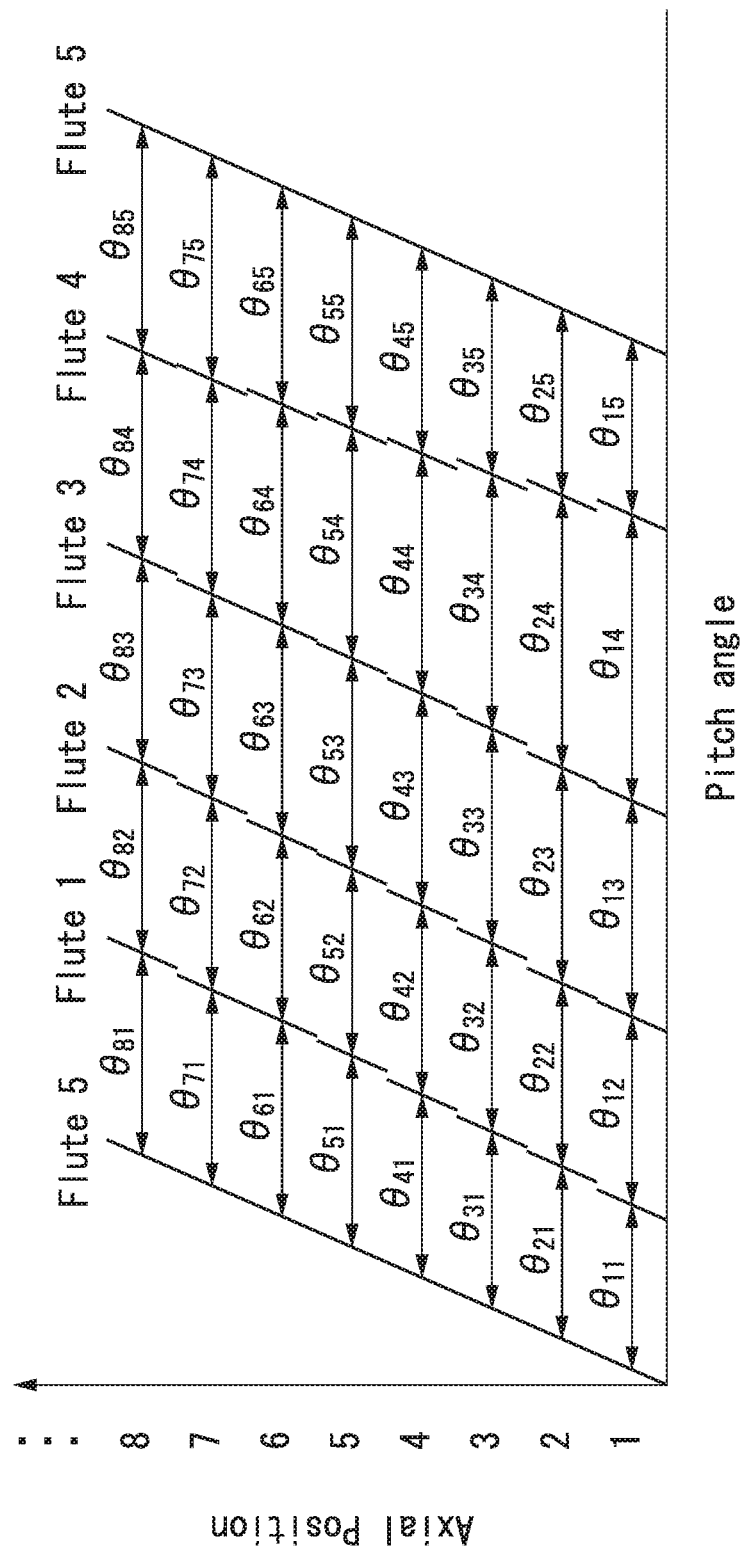
FIG. 5 is a view showing a magnitude (a magnitude relationship) of an angle θ and an arrangement of an angle θ.

In addition, the example shown in a graph of FIG. 5 shows a case where the layout line of the plurality of cutting inserts 5 arranged along the predetermined chip discharge groove 3 (Flute 5) is set to the fixed lead between all the cutting inserts 5 including the first stage cutting inserts 5.

In the present specification, the "layout line" indicates an imaginary line (virtual helical winding line) which connects predetermined points (for example, distal ends of the cutting edges 6 protruding from the outer periphery of the tool body 2 in the direction of the axial line O) of the outer peripheral cutting edges (cutting edges 6) of the respective cutting inserts 5 forming a row along the chip discharge groove 3.

In addition, the "lead" indicates a displacement amount in the direction of the axial line O per unit angle along the axial line O (or per unit length (circumferential length) in the circumferential direction). Specifically, as shown in FIG. 5, when the outer periphery of the tool body 2 is shown in a plane developed view (a horizontal axis indicates the circumferential direction and the vertical axis indicates the direction of the axial line O), the lead corresponds to an "inclination" of the layout line.

More specifically, in the predetermined chip discharge groove 3 (Flute 5), a virtual layout line (reference layout line) which becomes a reference is set, and the reference layout line is set to the fixed lead.

In addition, the example shown in FIG. 5 shows a case where all the layout lines (that is, the minimum unit of the layout line) of the adjacent cutting inserts 5 in the chip discharge grooves 3 accords with the reference layout line.

However, the present embodiment is not limited to this, and at least two layout lines may accord with the reference layout line.

Among the plurality of chip discharge grooves 3 provided on the outer periphery of the tool body 2, in the chip discharge grooves 3 (Flutes 1 to Flutes 4) other than the predetermined chip discharge grooves 3 (Flute 5), the leads between the cutting inserts 5 arranged in the grooves are variously changed and are not constant.

In addition, in the present embodiment, among the plurality of chip discharge grooves 3, only one predetermined chip discharge groove 3 (Flute 5) is provided. However, the present embodiment is not limited to this. A plurality of predetermined chip discharge grooves 3 may be provided.

As shown in FIG. 2, in the plurality of cutting inserts 5 arranged in the chip discharge groove 3, the cutting inserts 5 adjacent to each other in the chip discharge groove 3 are disposed such that rotational loci of the outer peripheral cutting edges (cutting edges 6) around the axial line O overlap each other in the direction of the axial line O.

In addition, the rotational loci of the outer peripheral cutting edges of the plurality of cutting inserts 5 arranged in the chip discharge grooves 3 form a virtual cylindrical surface about the axial line O as a whole.

[Angle θ]

In the present specification, as shown in FIGS. 3A, 3B, 4A, and 4B, in a cross-sectional view perpendicular to the axial line O, a center angle formed between a pair of virtual straight lines which connects each of the cutting edges 6 of the cutting inserts 5 disposed in the pair of chip discharge grooves 3 adjacent to each other in the circumferential direction and the axial line O is defined as an angle θ.

In other words, in one chip discharge groove 3 and the other chip discharge groove 3 adjacent to each other in the circumferential direction, in a cross-sectional view perpendicular to the axial line O, the center angle formed between one virtual straight line which connects each of the cutting edge 6 of the cutting insert 5 disposed in the one chip discharge groove 3 and the axial line O to each other and the other virtual straight line which connects each of the cutting edge 6 of the cutting insert 5 disposed in the other chip discharge groove 3 and the axial line O to each other is defined as the angle θ.

Moreover, in at least a cross-sectional view (in a cross-sectional view shown in FIG. 3A) in which the outer peripheral cutting edges 6 of the first stage cutting inserts 5 positioned on the most distal end side in the direction of the axial line O among the plurality of cutting inserts 5 arranged along the chip discharge grooves 3 are shown, and a cross-sectional view (a cross-sectional view shown in FIG. 3B) in which the outer peripheral cutting edges 6 of the second stage cutting inserts 5 adjacent to the posterior end sides of the first stage cutting inserts 5 in the direction of the axial line O are shown, the plurality of angles θ (angles θ11 to 15, angles θ21 to 25) formed around the axial line O includes the one maximum angle θmax (angle θ11 (θ1max), angle θ21 (θ2max)) and the one minimum angle θmin (angle θ12 (θ1min), angle θ22 (θ2min)), and two or more angles θ (angles θ13 to 15, angles θ23 to 25) other than the angle θmax and the angle θmin.

Figure 3A:
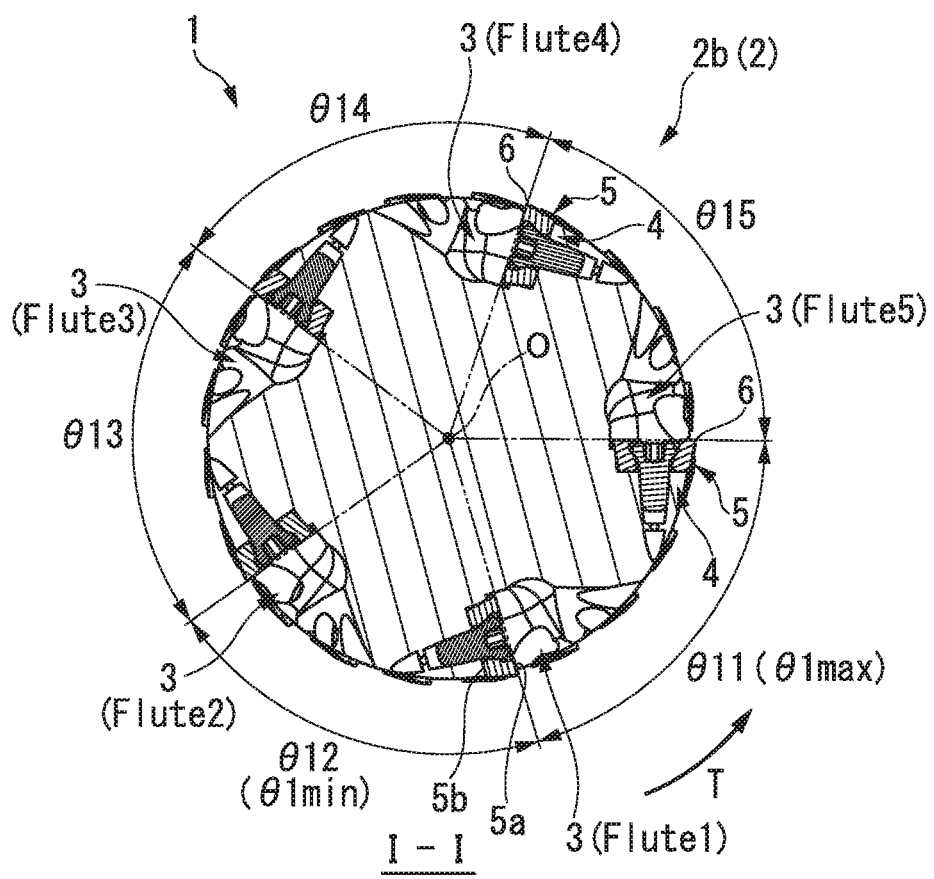
FIG. 3A is a view showing a cross section taken along I-I of FIG. 2.

Specifically, in the cross-sectional view in which the first stage cutting inserts 5 shown in FIG. 3A are shown, all the plurality of angles θ (angles θ11 to 15) formed around the axial line O are different from each other.

Figure 3B:
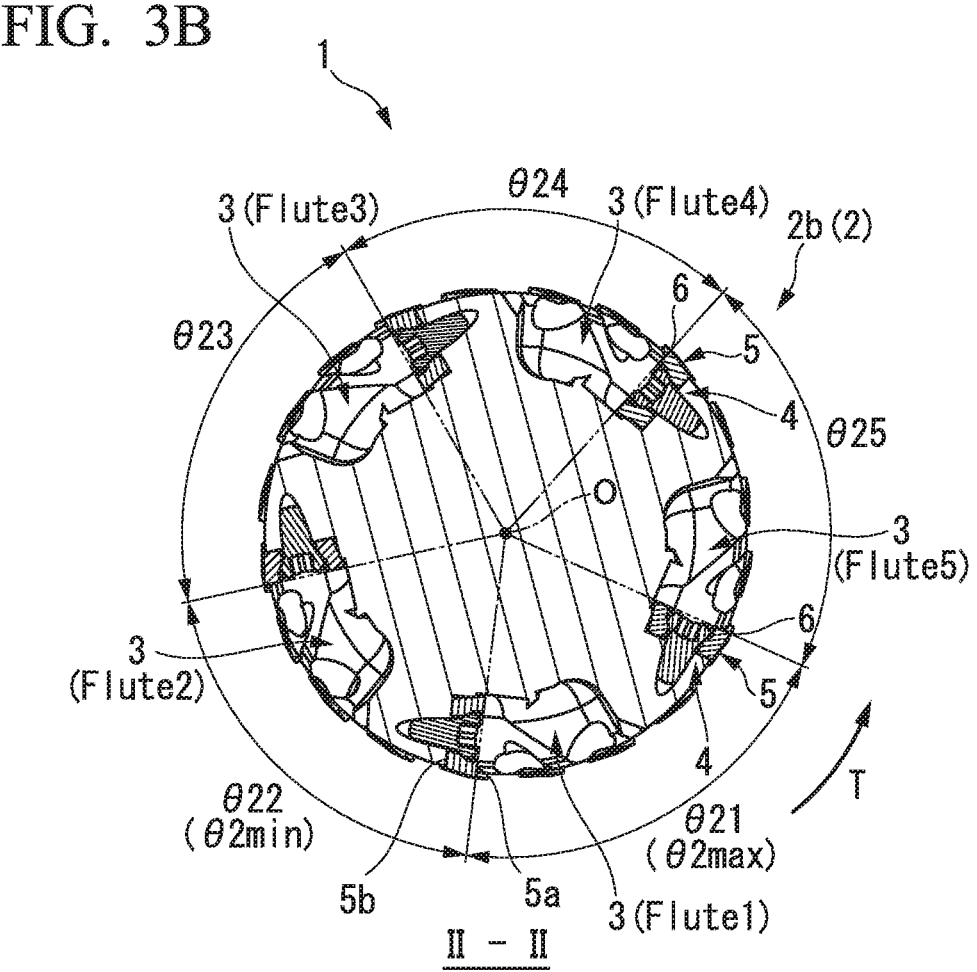
FIG. 3B is a view showing a cross section taken along II-II of FIG. 2.

In addition, in the cross-sectional view in which the second stage cutting inserts 5 shown in FIG. 3B are shown, all the plurality of angles θ (angles θ21 to 25) formed around the axial line O are different from each other.

More specifically, in each of the cross-sectional view in which the first stage cutting inserts 5 shown in FIG. 3A are shown and the cross-sectional view in which the second stage cutting inserts 5 shown in FIG. 3B are shown, all the plurality of angles θ (angles θ11 to 15 and angles θ21 to 25) formed around the axial line O are different from each other.

However, the present invention is not limited to this. That is, the present invention may adopt any configuration as long as the one angle θmax, the one angle θmin, and two or more angles other than the angles θmax and θmin are provided in at least each of the cross-sectional views of the first and second stages. Accordingly, some angles of the angles θ may have common angle values.

In the present embodiment, in a cross-sectional view of the indexable end mill 1, the three or more stages cutting inserts 5 including the one angle θmax, the one angle θmin, and two or more angles θ other than the angles θmax and θmin are provided in the direction of the axial line O.

More specifically, in each of the cross-sectional views (FIGS. 3A, 3B, 4A, and 4B) in which the outer peripheral cutting edges 6 of the three or more stage (specifically, first to fourth stage) cutting inserts 5 among the plurality of cutting inserts 5 arranged along the chip discharge grooves 3 are shown, all the plurality of angles θ (angles θ11 to 15, angles θ21 to 25, angles θ31 to 35, and angles θ41 to 45) formed around the axial line O are different from each other.

In addition, although it is not particularly shown, in each of the cross-sectional views in which the outer peripheral cutting edges 6 of the fifth to eighth stage cutting inserts 5 are shown, all the plurality of angles θ (angles θ51 to 55, angles θ61 to 65, angles θ71 to 75, and angles θ81 to 85) formed around the axial line O are different from each other.

In addition, the angles θ51 to 55, the angles θ61 to 65, the angles θ71 to 75, and the angles θ81 to 85 of the fifth to eighth stages correspond to the angles θ11 to 15, the angles θ21 to 25, the angles θ31 to 35, and the angles θ41 to 45 of the first to fourth stages in this order, and the corresponding pair of angles θ have the same value as each other.

In addition, in each of the cross-sectional views in which the outer peripheral cutting edges 6 of the ninth to twelfth stage cutting inserts 5 are shown, all the plurality of angles θ (angles θ91 to 95, angles θ101 to 105, angles θ111 to 115, and angles θ121 to 125) formed around the axial line O are different from each other.

Moreover, the angles θ91 to 95, the angles θ101 to 105, the angles θ111 to 115, and the angles θ121 to 125 of the ninth to twelfth stages correspond to the angles θ11 to 15, the angles θ21 to 25, the angles θ31 to 35, and the angles θ41 to 45 of the first to fourth stages in this order, and the corresponding pair of angles θ have the same value as each other.

That is, a disposition pitch of the first to fourth stage cutting inserts 5 in the circumferential direction is repeated in the fifth to eighth stage cutting inserts 5 and the ninth to twelfth stage cutting inserts 5.

Accordingly, in the following descriptions, the disposition of the first to fourth stage cutting inserts 5 will be described in detail, and since the disposition of the fifth to eighth stage cutting inserts 5 and the disposition of the ninth to twelfth stage cutting inserts 5 are similar to those of the first to fourth stage cutting inserts 5, descriptions thereof will be omitted.

A magnitude relationship of the angles θ in the present embodiment will be specifically described.

In the cross-sectional view in which the first stage cutting inserts 5 shown in FIG. 3A are shown, among the plurality of angles θ1 (angles θ11 to θ15) formed around the axial line O, the angle θ11 formed between the cutting insert 5 of Flute 5 and the cutting insert 5 of Flute 1 becomes the maximum angle θ1max.

In addition, the angle θ11 (angle θ1max), the angle θ13, the angle θ15, the angle θ14, and the angle θ12 decrease in this order.

Accordingly, among the angles θ11 to θ15, the angle θ12 formed between the cutting insert 5 of Flute 1 and the cutting insert 5 of Flute 2 becomes the minimum angle θ1min.

Moreover, in the cross-sectional view in which the second stage cutting inserts 5 shown in FIG. 3B are shown, among the plurality of angles θ2 (angles θ21 to θ25) formed around the axial line O, the angle θ21 formed between the cutting insert 5 of Flute 5 and the cutting insert 5 of Flute 1 becomes the maximum angle θ2max.

In addition, the angle θ21 (angle θ2max), the angle θ23, the angle θ25, the angle θ24, and the angle θ22 decrease in this order.

Accordingly, among the angles θ21 to θ25, the angle θ22 formed between the cutting insert 5 of Flute 1 and the cutting insert 5 of Flute 2 becomes the minimum angle θ2min.

Figure 4A:
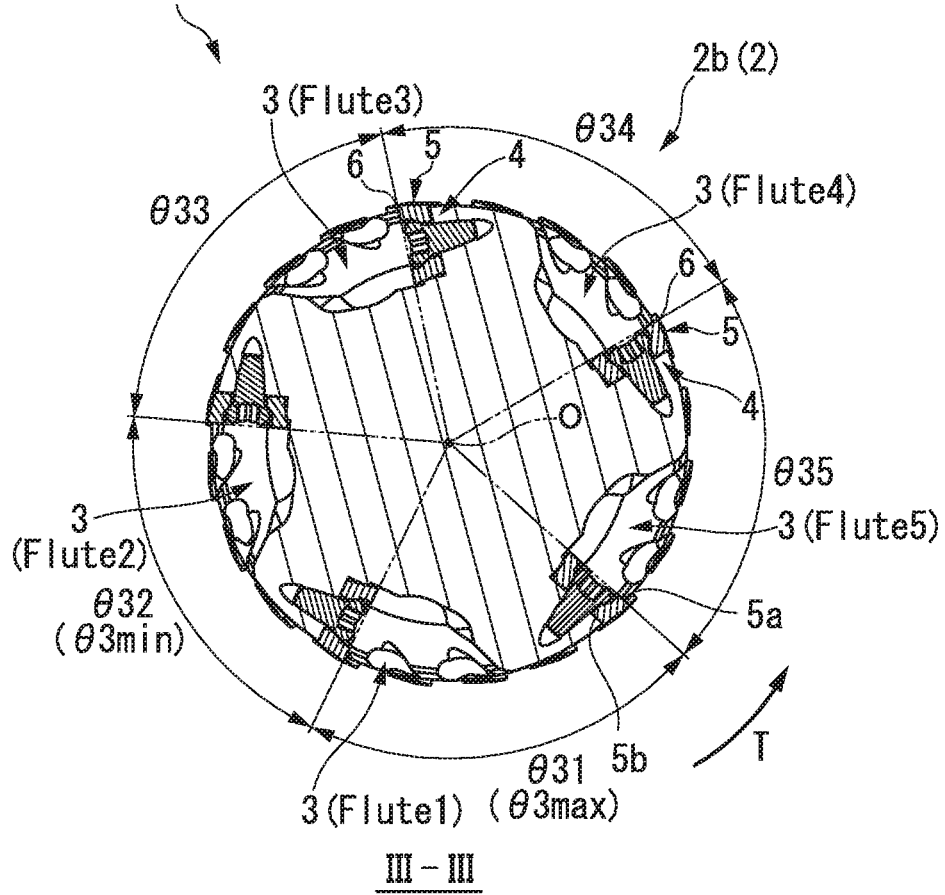
FIG. 4A is a view showing a cross section taken along III-III of FIG. 2.

In addition, in the cross-sectional view in which the third stage cutting inserts 5 shown in FIG. 4A are shown, among the plurality of angles θ3 (angles θ31 to θ35) formed around the axial line O, the angle θ31 formed between the cutting insert 5 of Flute 5 and the cutting insert 5 of Flute 1 becomes the maximum angle θ3max.

In addition, the angle θ31 (angle θ3max), the angle θ33, the angle θ35, the angle θ34, and the angle θ32 decrease in this order.

Accordingly, among the angles θ31 to θ35, the angle θ32 formed between the cutting insert 5 of Flute 1 and the cutting insert 5 of Flute 2 becomes the minimum angle θ3min.

Figure 4B:
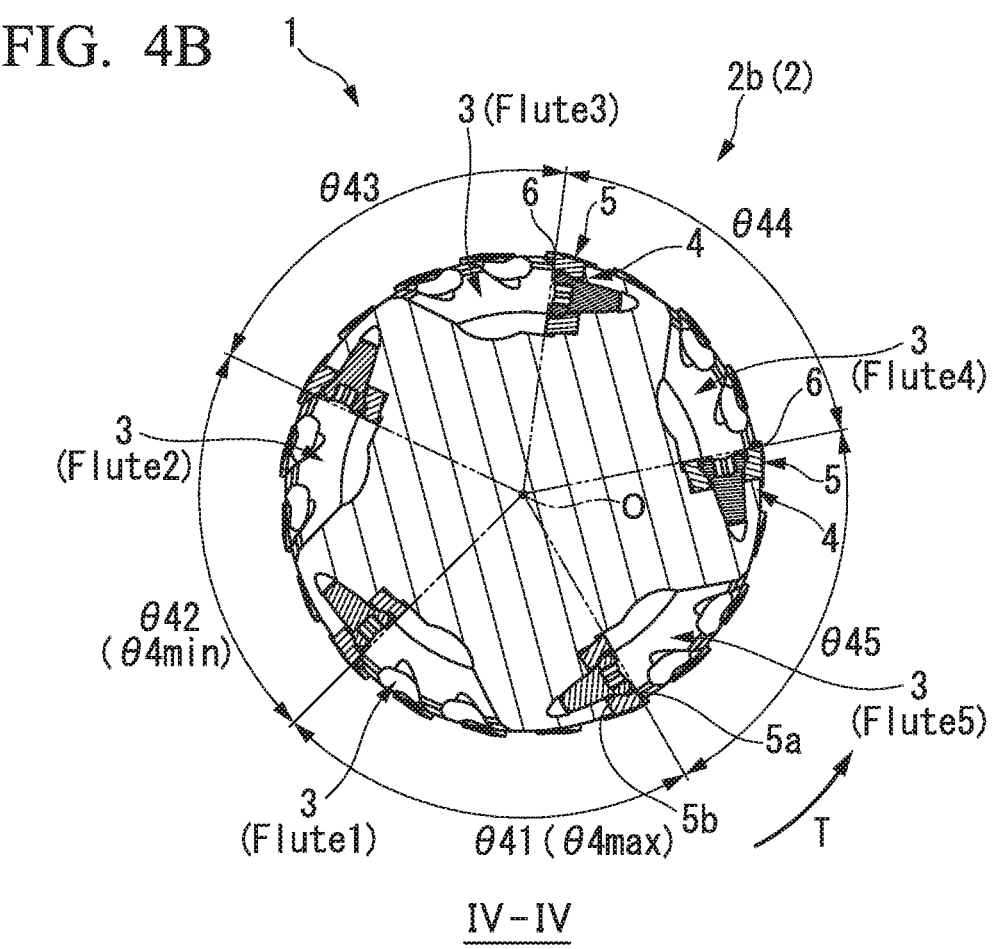
FIG. 4B is a view showing a cross section taken along IV-IV of FIG. 2.

In addition, in the cross-sectional view in which the fourth stage cutting inserts 5 shown in FIG. 4B are shown, among the plurality of angles θ4 (angles θ41 to θ45) formed around the axial line O, the angle θ41 formed between the cutting insert 5 of Flute 5 and the cutting insert 5 of Flute 1 becomes the maximum angle θ4max.

In addition, the angle θ41 (angle θ4max), the angle θ43, the angle θ45, the angle θ44, and the angle θ42 decrease in this order.

Accordingly, among the angles θ41 to θ45, the angle θ42 formed between the cutting insert 5 of Flute 1 and the cutting insert 5 of Flute 2 becomes the minimum angle θ4min.

In addition, in each of the cross-sectional views in which the first to fourth stage cutting inserts 5 shown in FIGS. 3A, 3B, 4A, and 4B are shown, among the plurality of angles θ formed around the axial line O, the maximum angle θmax (angles θ1max to θ4max) and the minimum angle θmin (angles θ1min to θ4min) are disposed to be adjacent to each other in the circumferential direction.

Specifically, in each of the cross-sectional views in which the first to fourth stage cutting inserts 5 are shown, the maximum angle θmax (angles θ11, 21, 31, and 41), the minimum angle θmin (angles θ12, 22, 32, 42), the second largest angles θ (angles θ13, 23, 33, 43), the second smallest angles θ (angles θ14, 24, 34, 44), and the angles θ (angles θ15, 25, 35, 45) having a value of an intermediate magnitude are arranged around the axial line O in this order.

In addition, in the example shown in the present embodiment, the angles are arranged around the axial line P in the order toward the side opposite to the tool rotation direction T. However, the present invention is not limited to this, and the angles may be arranged in the order toward the tool rotation direction T.

Moreover, in the present embodiment, the number of the chip discharge grooves 3 is five. However, the number of the chip discharge grooves 3 of the present invention may be any one as long as the number is at least four. Accordingly, in the case where the number of the chip discharge grooves 3 is four, in the cross-sectional view in which the cutting inserts 5 are shown, the maximum angle θmax, the minimum angle θmin, the second largest angle θ, and the second smallest angle θ are arranged around the axial line O in this order.

In addition, in the cross-sectional view in which the cutting inserts 5 are shown, in the arrangement order, among the plurality of angles θ formed around the axial line θ, the maximum angle θmax and the second largest angle θ are disposed to be adjacent to both sides of the minimum angle θmin in the circumferential direction.

However, the arrangement order of the plurality of angles θ formed around the axial line O in the circumferential direction is not limited to the example described in the present embodiment.

That is, although not particularly shown, in the cross-sectional view in which the cutting inserts 5 are shown, among the plurality of angles θ formed around the axial line O, the minimum angle θmin and the second smallest angle θ may be disposed to be adjacent to both sides of the maximum angle θmax in the circumferential direction.

Specifically, among the plurality of angles θ formed around the axial line O in the cross-sectional view, preferably, an angle θ which is larger than a median value and an angle θ which is smaller than the median value are disposed to be adjacent to each other to form a pair, and an average value of the pair becomes a value close to an average value of a pair of other angles θ.

In addition, as shown in FIGS. 3A, 3B, 4A, and 4B, the maximum angle θmax (angle θ1max) among the plurality of angles θ (angles θ1) formed around the axial line O in the cross-sectional view in which the first stage cutting inserts 5 are shown, the maximum angle θmax (angle θ2max) among the plurality of angles θ (angles θ2) formed around the axial line O in the cross-sectional view in which the second stage cutting inserts 5 are shown, the maximum angle θmax (angle θ3max) among the plurality of angles θ (angles θ3) formed around the axial line θ in the cross-sectional view in which the third stage cutting inserts 5 are shown, and the maximum angle θmax (angle θ4max) among the plurality of angles θ (angles θ4) formed around the axial line O in the cross-sectional view in which the fourth stage cutting inserts 5 are shown are disposed between the same pair of chip discharge grooves 3 (between Flute 5 and Flute 1).

That is, the angle θ1max, the angle θ2max, the angle θ3max, and the angle θ4max are disposed between the chip discharge grooves 3 (that is, between Flute 5 and Flute 1) adjacent to each other in the circumferential direction.

In addition, the minimum angle θmin (angle θ1min) among the plurality of angles θ (angles θ1) formed around the axial line O in the cross-sectional view in which the first stage cutting inserts 5 are shown, the minimum angle θmin (angle θ2min) among the plurality of angles θ (angles θ2) formed around the axial line O in the cross-sectional view in which the second stage cutting inserts 5 are shown, the minimum angle θmin (angle θ3min) among the plurality of angles θ (angles θ3) formed around the axial line θ in the cross-sectional view in which the third stage cutting inserts 5 are shown, and the minimum angle θmin (angle θ4min)

among the plurality of angles θ (angles θ4) formed around the axial line O in the cross-sectional view in which the fourth stage cutting inserts 5 are shown are disposed between the same pair of chip discharge grooves 3 (between Flute 1 and Flute 2).

That is, the angle θ1min, the angle θ2min, the angle θ3min, and the angle θ4min are disposed between the chip discharge grooves 3 (that is, between Flute 1 and Flute 2) adjacent to each other in the circumferential direction.

In addition, the second largest angle θ (angle θ13) among the plurality of angles θ (angles θ1) formed around the axial line O in the cross-sectional view in which the first stage cutting inserts 5 are shown, the second largest angle θ (angle θ23) among the plurality of angles θ (angles θ2) formed around the axial line O in the cross-sectional view in which the second stage cutting inserts 5 are shown, the second largest angle θ (angle θ33) among the plurality of angles θ (angles θ3) formed around the axial line O in the cross-sectional view in which the third stage cutting inserts 5 are shown, and the second largest angle θ (angle θ43) among the plurality of angles θ (angles θ4) formed around the axial line O in the cross-sectional view in which the fourth stage cutting inserts 5 are shown are disposed between the same pair of chip discharge grooves 3 (between Flute 2 and Flute 3).

That is, the angle θ13, the angle θ23, the angle θ33, and the angle θ43 are disposed between the chip discharge grooves 3 (that is, between Flute 2 and Flute 3) adjacent to each other in the circumferential direction.

In addition, the second smallest angle θ (angle θ14) among the plurality of angles θ (angles θ1) formed around the axial line O in the cross-sectional view in which the first stage cutting inserts 5 are shown, the second smallest angle θ (angle θ24) among the plurality of angles θ (angles θ2) formed around the axial line O in the cross-sectional view in which the second stage cutting inserts 5 are shown, the second smallest angle θ (angle θ34) among the plurality of angles θ (angles θ3) formed around the axial line O in the cross-sectional view in which the third stage cutting inserts 5 are shown, and the second smallest angle θ (angle θ44) among the plurality of angles θ (angles θ4) formed around the axial line O in the cross-sectional view in which the fourth stage cutting inserts 5 are shown are disposed between the same pair of chip discharge grooves 3 (between Flute 3 and Flute 4).

That is, the angle θ14, the angle θ24, the angle θ34, and the angle θ44 are disposed between the chip discharge grooves 3 (that is, between Flute 3 and Flute 4) adjacent to each other in the circumferential direction.

In addition, the angle θ (angle θ15) having the median value among the plurality of angles θ (angles θ1) formed around the axial line O in the cross-sectional view in which the first stage cutting inserts 5 are shown, the angle θ (angle θ25) having the median value among the plurality of angles θ (angles θ2) formed around the axial line O in the cross-sectional view in which the second stage cutting inserts 5 are shown, the angle θ (angle θ35) having the median value among the plurality of angles θ (angles θ3) formed around the axial line O in the cross-sectional view in which the third stage cutting inserts 5 are shown, and the angle θ (angle θ45) having the median value among the plurality of angles θ (angles θ4) formed around the axial line O in the cross-sectional view in which the fourth stage cutting inserts 5 are shown are disposed between the same pair of chip discharge grooves 3 (between Flute 4 and Flute 5).

That is, the angle θ15, the angle θ25, the angle θ35, and the angle θ45 are disposed between the chip discharge grooves 3 (that is, between Flute 4 and Flute 5) adjacent to each other in the circumferential direction.

In addition, the graph shown in FIG. 5 is a developed view of the layout line of the cutting inserts 5 in the case where the outer periphery of the tool body 2 is developed into a plane shape, and the layout line is shown to be emphasized in FIG. 5.

In FIG. 5, each stage of the cutting inserts 5 arranged in the chip discharge groove 3 is shown in the longitudinal axis (the first to eight stages are shown in FIG. 5), and the magnitude relationship of the plurality of angles θ arranged around the axial line O in each stage is shown in the horizontal axis.

However, the graph in FIG. 5 is shown to make it easy to visually understand that the angles θ are different from each other, and thus, it should be noted that the shown magnitude relationship is displayed (unrelated) differently from the magnitude relationship of the above-described actual angles θ.

Moreover, as described above, the graph shown in FIG. 5 shows the case where the layout line of the plurality of cutting inserts 5 arranged along the predetermined chip discharge groove 3 (Flute 5) among the plurality of chip discharge grooves 3 provided on the outer periphery of the tool body 2 is set to the fixed lead between the cutting inserts 5 disposed after at least the second stage. In addition, the graph in FIG. 5 shows a case where at least two layout lines of each of the adjacent cutting inserts 5 in the chip discharge grooves 3 accords with the reference layout line of the predetermined chip discharge groove 3 (Flute 5). However, the present invention is not limited to this.

Figure 6:
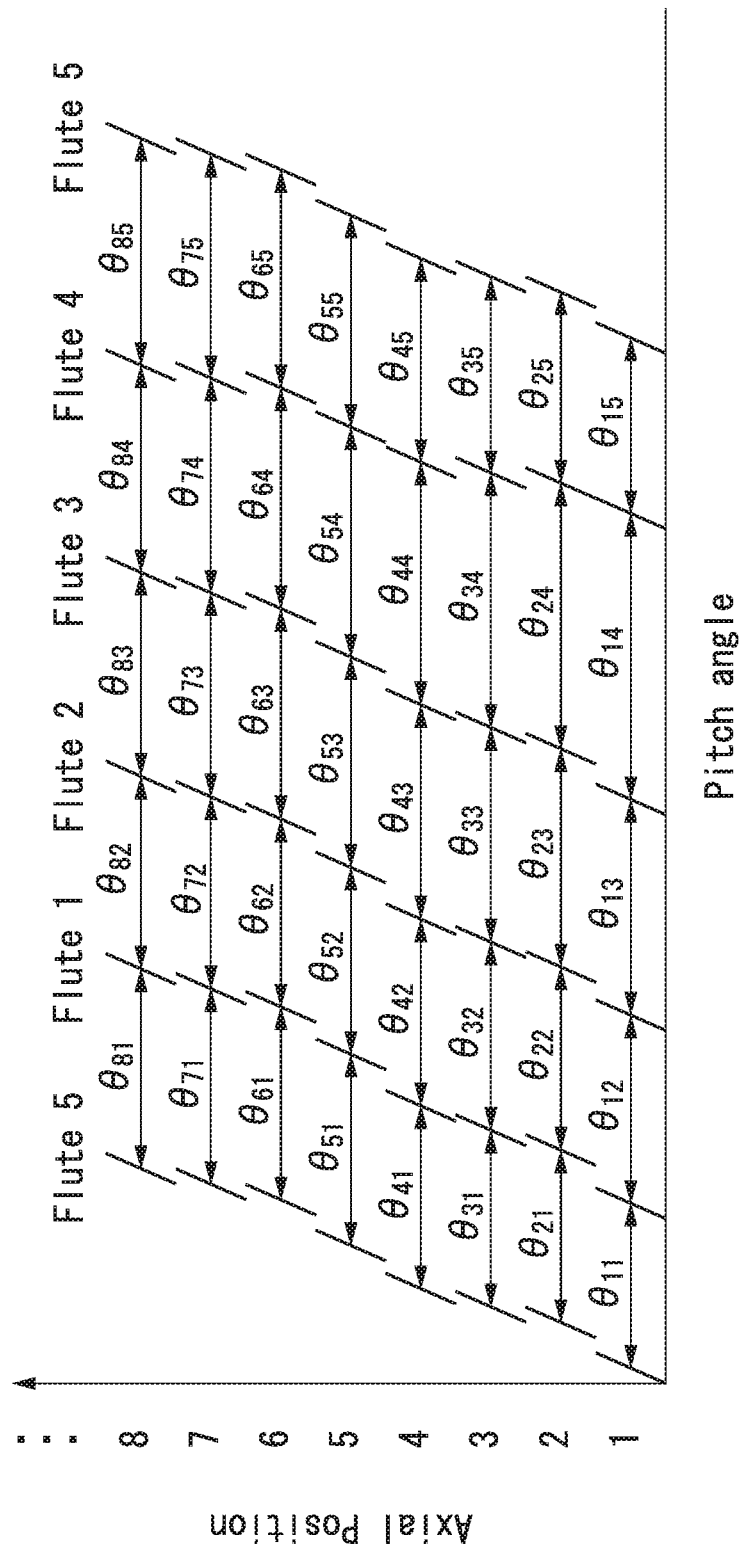
FIG. 6 is a view showing a magnitude (a magnitude relationship) of an angle θ and an arrangement of an angle θ.

That is, as shown in the graph in FIG. 6, all the layout lines of the plurality of cutting inserts 5 arranged along the plurality of chip discharge grooves 3 provided on the outer periphery of the tool body 2 may not be set to the fixed lead.

[Effect of Present Embodiment]

In the indexable end mill 1 of the above-described present embodiment, at least all the angles θ (angles θ1) formed around the axial line O in the cross-sectional view in which the cutting edges 6 of the first stage cutting inserts 5 positioned on the most distal end side in the direction of the axial line O are shown and at least all the angles θ (angles θ2) formed around the axial line O in the cross-sectional view in which the cutting edges 6 of the second stage cutting inserts 5 adjacent to the posterior end sides of the first stage cutting inserts 5 in the direction of the axial line O are shown include the one maximum angle θmax (angle θ1max, angle θ2max)) and the one minimum angle θmin (angle θ1min, angle θ2min)), and two or more angles θ other than the angle θmax and the angle θmin.

In this way, in the cross-sectional view (in the stage of the cutting inserts 5) of the indexable end mill 1, at least three angles θ having angles different from each other are provided. Accordingly, during cutting, it is possible to cause a phase difference of regenerative vibrations of vibrations generated during the machining by the cutting edges 6 of one cutting insert 5 cutting into a work material to be different from a phase difference of regenerative vibrations of vibrations generated during the machining by the cutting edges 6 of other cutting inserts 5 cutting into the work material, and thus, a specific phase difference is easily obtained.

That is, the phases of the regenerative vibrations of the respective cutting edges 6 can be set to be different from each other. Accordingly, a value obtained by averaging regenerative vibration vectors can approximate zero. Therefore, it is possible to remarkably decrease self-excited vibrations during cutting.

Particularly, in the case where four or more chip discharge grooves 3 are provided on the outer periphery of the tool body 2, the number of angles θ formed around the axial line O is four or more, and thus, the number of angles increases. Accordingly, in the related art, from the viewpoint of ease of design, the angles θ are set to a common value.

In the present embodiment, the number of the angles θ shown in the same cross-sectional view is four or more. Accordingly, even when the number of the angles θ increases, the angles θ can be set to at least three kinds (θmax, θmin, and θ other than these) of values different from each other. The present embodiment has a unique configuration, and thus, remarkable vibration suppression effects are obtained.

As described above, according to the present embodiment, self-excited vibrations can be decreased during cutting, and thus, the occurrence of chattering vibrations is effectively decreased.

Accordingly, it is possible to stably maintain cutting with high accuracy, and a machining surface of a work material can stably have a high quality. Moreover, vibration suppression effects can be sufficiently obtained, and thus, it is possible to increase a machining speed of cutting and it is possible to improve machining efficiency.

Moreover, in the present embodiment, in the cross-sectional view of the indexable end mill 1, three or more stages (specifically, twelve stages) of the cutting inserts 5 including the one angle θmax, the one angle θmin, the two or more angles θ other than the angle θmax and the angle θmin are provided in the direction of the axial line O. Accordingly, the above-described effects of the present embodiment are obtained over total three stages of the cutting inserts 5, which is more remarkable.

In addition, in the present embodiment, in the cross-sectional view, all the plurality of angles θ formed around the axial line O are different from each other, and thus, the following effects are obtained.

That is, in this case, the plurality of cutting inserts provided with gaps therebetween in the circumferential direction at the same position (the same stage) of the tool body 2 in the direction of the axial line O are disposed at unequal pitches (unequal division) in the circumferential direction, and all the cutting inserts 5 are arranged at various angles θ having values different from each other.

Accordingly, during cutting, a phase difference of regenerative vibrations of vibrations generated during the machining by the cutting edges 6 of one cutting insert 5 cutting into a work material can be different from a phase difference of regenerative vibrations of vibrations generated during the machining by cutting edges 6 of other cutting inserts 5 cutting into the work material, and thus, a specific phase difference is easily obtained.

In this way, the phase differences of the regenerative vibrations generated at the respective cutting edges 6 can be set to be different from each other (that is, the phase difference are different from each other), and thus, a value obtained by averaging regenerative vibration vectors can approximate zero. Therefore, self-excited vibrations during cutting are remarkably decreased.

In addition, in the present embodiment, the plurality of cutting inserts 5 provided with gaps therebetween in the circumferential direction at the same position (the same stage) of the tool body 2 in the direction of the axial line O are disposed at unequal pitches (unequal division) in the circumferential direction, and all the cutting inserts are arranged at various angles θ having values different from each other. Furthermore, even if the respective angles (angles θ1 and angles θ2) of the first stage and the second stage are compared to each other, all the angles θ are set to values different from each other.

In this way, in the plurality of stages (the stages of the cutting inserts 5) in the direction of the axial line O, all the angles θ are different from each other. Therefore, robustness properties can be effectively applied (robustness can be optimized). Accordingly, prevention effects of self-excited vibrations can be further expected.

In addition, the example of the present embodiment is configured such that all the angles θ are set to values different from each other over the plurality of stages (for example, three or more stages, four stages in the present embodiment) including at least the first stage and the second stage. Accordingly, the above-described effects are extensively exerted in not only the first and second stages but also the first to fourth stages.

In addition, the effects similar to those of the first to fourth stages are exerted in the fifth to eighth stages and the ninth to twelfth stages. Accordingly, vibration suppression effects are more remarkable.

In addition, in the example of FIG. 5 described in the present embodiment, the layout line of the plurality of cutting inserts 5 arranged along the predetermined chip discharge groove 3 (Flute 5) among the plurality of chip discharge grooves 3 is formed to be set to the fixed lead (inclination) between the cutting inserts 5 disposed after at least the second stage. Accordingly, when all the angles θ are set to the values different from each other over the plurality of stages as described above, in a state where the cutting inserts 5 arranged in the predetermined chip discharge groove 3 are set to the reference (the reference row), it is possible to easily dispose other cutting inserts 5.

In addition, at least two layout lines of each of the adjacent cutting inserts 5 in the chip discharge grooves 3 accords with the reference layout line of the predetermined chip discharge groove 3 (Flute 5). Therefore, the same effects are obtained.

Moreover, as described in the present embodiment, the maximum angle θ1max in the cross-sectional view in which the first stage cutting inserts 5 are shown and the maximum angle θ2max in the cross-sectional view in which the second stage cutting inserts 5 are shown are disposed between the same pair of chip discharge grooves 3. Alternatively, the minimum angle θ1min in the cross-sectional view in which the first stage cutting inserts 5 are shown and the minimum angle θ2min in the cross-sectional view in which the second stage cutting inserts 5 are shown are disposed between the same pair of chip discharge grooves 3.

Accordingly, it is possible to prevent interference between the first stage cutting insert 5 and the second stage cutting insert 5 adjacent to each other in the chip discharge grooves 3.

That is, the maximum angle θ1max in the first stage and the maximum angle θ2max in the second stage become a value close to each other. In addition, the minimum angle θ1min in the first stage and the minimum angle θ2min in the second stage become a value close to each other.

In this way, the angles θ having approximate magnitudes are disposed to be adjacent to each other in the extension direction of the chip discharge groove 3, and thus, the leads (inclination) of the layout lines of the first and second stage cutting inserts 5 arranged in the chip discharge groove 3 are not greatly different from each other in each of the chip discharge grooves 3 to be stabilized.

Accordingly, it is possible to cause the gap between the first and second stage cutting inserts 5 in the circumferential direction in each of the chip discharge grooves 3 to be within a predetermined range. Therefore, it is possible to prevent the cutting inserts 5 from being disposed to be extremely close to each other or away from each other in the circumferential direction.

Specifically, for example, if the gap between the first and second stage cutting inserts 5 in the circumferential direction in the chip discharge groove 3 decreases greatly, it is difficult to attach any one of the first and second stage cutting inserts 5 to the tool body 2. In addition, even when the first and second stage cutting inserts 5 can be attached to the tool body 2, there is a concern that chips generated by cutting of the second stage cutting inserts 5 may interfere with the first stage cutting inserts 5.

In addition, if the gap between the first and second stage cutting inserts 5 in the circumferential direction in the chip discharge groove 3 increases greatly, a large step difference is formed between the first stage cutting insert 5 and the second stage cutting insert 5, and thus, there is a concern that chip discharge performance may deteriorate.

According to the above-described configuration of the present embodiment, it is possible to remarkably prevent the problems.

In addition, the effects are exerted not only in the first and second stages but also in the first to fourth stages, the fifth to eighth stages, and the ninth to twelfth stages.

Moreover, in the present embodiment, in the cross-sectional view in which the cutting inserts 5 are shown, the maximum angle $\theta$max and the minimum angle $\theta$min among all the angles $\theta$ formed around the axial line O are disposed to be adjacent to each other in the circumferential direction, and thus, (angle $\theta$max+angle $\theta$min)/2 which is an average value of the maximum angle $\theta$max and the minimum angle $\theta$min becomes a value approximate to other angles $\theta$.

Therefore, it is possible to easily balance the rotation of the indexable end mill 1. Specifically, it is possible to cause the center of gravity of the tool to accord with the axial line O which is the rotation center or dispose the center of gravity of the tool to be close to the axial line O.

Specifically, for example, unlike the above-described configuration, in the case where the second largest angle $\theta$ and the third largest angle $\theta$ are disposed to be adjacent to both sides of the angle $\theta$max in the circumferential direction, the chip discharge grooves 3 adjacent to each other in the circumferential direction are densely disposed in a region positioned on the side opposite to these in the circumferential direction. Therefore, it may be difficult to balance the rotation of the entire tool.

Moreover, in the case where the second smallest angle $\theta$ and the third smallest angle $\theta$ are disposed to be adjacent to both sides of the angle $\theta$min in the circumferential direction, the gap between the chip discharge grooves 3 adjacent to each other in the circumferential direction excessively increases in a region positioned on the side opposite to these in the circumferential direction. Accordingly, it may be difficult to balance the rotation of the entire tool.

According to the above-described configuration of the present embodiment, it is possible to remarkably prevent the problems.

In addition, as described in the present embodiment, the minimum angle $\theta$min and the second smallest angle $\theta$ are respectively arranged on both sides of the maximum angle $\theta$max in the circumferential direction. Moreover, the maximum angle $\theta$max and the second largest angle $\theta$ are respectively arranged on both sides of the minimum angle $\theta$min in the circumferential direction. In addition, the maximum angle $\theta$max, the minimum angle $\theta$min, the second largest angle $\theta$, and the second smallest angle $\theta$ are arranged around the axial line O in this order.

Accordingly, the plurality of angles $\theta$ formed around the axial line O are arranged to repeat large, small, large, and small in the circumferential direction. That is, large angles $\theta$ and small angles $\theta$ are alternately arranged.

Therefore, it is possible to easily balance the rotation of the indexable end mill 1. Specifically, it is possible to cause the center of gravity of the tool to accord with the axial line O which is the rotation center or dispose the center of gravity of the tool to be close to the axial line O.

In addition, more preferably, the above-described alternating arrangement of the magnitudes of the angles $\theta$ is used in at least the first stage and the second stage, and the dispositions of the magnitudes in the circumferential direction in the first stage and the second stage correspond to each other.

That is, as described in the present embodiment, the positions in the circumferential direction of the first stage angle $\theta$max and the second stage angle $\theta$max, the positions in the circumferential direction of the first stage angle $\theta$min and the second stage angle $\theta$min, the positions in the circumferential direction of the second largest angle $\theta$ in the first stage and the second largest angle $\theta$ in the second stage, the positions in the circumferential direction of the second smallest angle $\theta$ in the first stage and the second smallest angle $\theta$ in the second stage, and the positions in the circumferential direction of the angle $\theta$ having the median value in the first stage and the angle $\theta$ having the median value in the second stage correspond to each other, respectively.

Accordingly, it is possible to remarkably decrease interference between the first stage cutting inserts 5 and the second stage cutting inserts 5 while satisfactorily maintaining the rotation balance of the tool.

In addition, similarly to the above-described those, the effects are exerted not only in the first and second stages but also in the first to fourth stages, the fifth to eighth stages, and the ninth to twelfth stages.

More preferably, the number of the chip discharge grooves 3 formed on the outer periphery of the tool body 2 is an even number.

That is, in such a case, the number of the angles $\theta$ formed around the axial line O is an even number. Therefore, pairs of large angles $\theta$ and small angles $\theta$ disposed to be adjacent to each other in the circumferential direction can be formed with exception. Accordingly, the average values of the pairs of large angles $\theta$ and small angles $\theta$ can be approximated to each other with exception, and the rotation balance is easily obtained.

In addition, in such a case, preferably, the number of the chip discharge grooves 3 is four or six. In the case where the number of the chip discharge grooves 3 is six or less, effects of easily balancing the rotation are more remarkably obtained. However, the number of the chip discharge grooves 3 may be an even number of eight or more.

Moreover, more preferably, in the case where the number of the chip discharge grooves 3 formed around the outer periphery of the tool body 2 is an odd number, the angles $\theta$ except for the pairs of large angles $\theta$ and small angles $\theta$ approximate the average value of the pairs of angles $\theta$.

[Other Configurations Included in The Present Invention]

Moreover, the present invention is not limited to the above-described embodiment, and various modifications can be applied to the present invention within a scope which does not depart from the gist of the present invention.

For example, in the above-described embodiment, the rotating tool of the present invention is described using the indexable end mill 1. However, the present invention is not limited to this.

That is, the rotating tool may be an end mill in which the cutting inserts 5 are fixed to the tool body 2 by brazing or the like and which is different from the indexable end mill. Moreover, the present invention is not limited to the end mill and can be applied to other rotating tools.

Moreover, in the above-described embodiment, the configuration is described in which all the angles θ are set to values different from each other over the plurality of stages (for example, three or more stages, four stages in the present embodiment) including at least the first stage and the second stage. However, the present invention is not limited to this.

That is, the unique technical characteristics of the present invention are that at least the plurality of angles θ of the first stage include the one maximum angle θmax, the one minimum angle θmin, and the two or more angles θ other than the angle θmax and the angle θmin and the plurality of angles θ of the second stage include the one maximum angle θmax, the one minimum angle θmin, and the two or more angles θ other than the angle θmax and the angle θmin.

Accordingly, for example, in the plurality of angles θ of the first stage and the plurality of angles θ of the second stage, the angles θ corresponding to each other (at least one pair among the angles θmax, the angles θmin, the second largest angles θ, the second smallest angles θ, and other angles θ) may be set to the same value. Moreover, this is similarly applied to a case where three stage or more including the first and second stages are provided.

Furthermore, configurations (constituent elements) described in the above-described embodiment and modifications may be combined within the scope which does not depart from the spirit of the present invention, and additions, omissions, replacements, and other modifications of the configurations can be applied to the present invention.

Moreover, the present invention is not limited to the above-described embodiment and is limited by only the claims.

INDUSTRIAL APPLICABILITY

According to the rotating tool of the present invention, it is possible to remarkably reduce the occurrence of chattering vibrations by decreasing self-excited vibrations during cutting. Therefore, the present invention has industrial applicability.

REFERENCE SIGNS LIST

1: indexable end mill (rotating tool)
2: tool body
3: chip discharge groove
5: cutting insert
6: cutting edge
O: axial line
T: tool rotation direction
θ: angle
θmax: maximum angle
θmin: the minimum angle

The invention claimed is:
1. A rotating tool, comprising:
a tool body which is formed in a columnar shape and rotates around an axial line;
a chip discharge groove which is formed on an outer periphery of the tool body and gradually extends toward a side opposite to a tool rotation direction around the axial line from a distal end of the tool body toward a posterior end side of the tool body; and
a plurality of cutting inserts which include cutting edges protruding from the outer periphery of the tool body toward the outside in a radial direction and are arranged in multiple stages along the chip discharge groove on a wall surface of the chip discharge groove facing the tool rotation direction,
wherein at least four chip discharge grooves are provided on the outer periphery of the tool body with gaps therebetween in a circumferential direction,
wherein in a cross-sectional view perpendicular to the axial line, when a center angle formed between a pair of virtual straight lines which connects each of the cutting edges of the cutting inserts disposed in a pair of chip discharge grooves adjacent to each other in the circumferential direction and the axial line to each other is defined as an angle θ,
in at least the cross-sectional view in which first stage cutting inserts positioned on the most distal end side in the direction of the axial line among the plurality of cutting inserts arranged along the chip discharge grooves are shown and the cross-sectional view in which second stage cutting inserts adjacent to the posterior end sides of the first stage cutting inserts in the direction of the axial line are shown, a plurality of angles θ formed around the axial line include one maximum angle θmax, one minimum angle θmin, and two or more angles θ other than the angle θmax and the angle θmin.

2. The rotating tool according to claim 1,
wherein in the cross-sectional view, all the plurality of angles θ formed around the axial line are different from each other.

3. The rotating tool according to claim 1,
wherein in at least the cross-sectional view in which the first stage cutting inserts are shown and the cross-sectional view in which the second stage cutting inserts are shown, all the plurality of angles θ formed around the axial line are different from each other.

4. The rotating tool according to claim 1,
wherein in the cross-sectional view, the cutting inserts of three or more stages including one angle θmax, one angle θmin, and two or more angles θ other than the angle θmax and the angle θmin are provided in the direction of the axial line.

5. The rotating tool according to claim 1,
wherein the maximum angle θmax (angle θ1max) among the plurality of angles θ (angle θ1) formed around the axial line in the cross-sectional view in which the first stage cutting inserts are shown and the maximum angle θmax (angle θ2max) among the plurality of angles θ (angle θ2) formed around the axial line in the cross-sectional view in which the second stage cutting inserts are shown are disposed between the chip discharge grooves adjacent to each other in the circumferential direction.

6. The rotating tool according to claim 1,
wherein the minimum angle θmin (angle θ1min) among the plurality of angles θ (angle θ1) formed around the axial line in the cross-sectional view in which the first stage cutting inserts are shown and the minimum angle θmin (angle θ2min) among the plurality of angles θ (angle θ2) formed around the axial line in the cross-sectional view in which the second stage cutting inserts are shown are disposed between the chip discharge grooves adjacent to each other in the circumferential direction.

7. The rotating tool according to claim 1,
wherein in the cross-sectional view, the maximum angle θmax and the minimum angle θmin among the plurality of angles θ formed around the axial line are disposed to be adjacent to each other in the circumferential direction.

8. The rotating tool according to claim 1,
wherein in the cross-sectional view, the minimum angle θmin and a second smallest angle θ are respectively disposed to be adjacent to both sides of the maximum angle θmax in the circumferential direction among the plurality of angles θ formed around the axial line.

9. The rotating tool according to claim 1,
wherein in the cross-sectional view, the maximum angle θmax and a second largest angle θ are respectively disposed to be adjacent to both sides of the minimum angle θmin in the circumferential direction among the plurality of angles θ formed around the axial line.

10. The rotating tool according to claim 1,
wherein in the cross-sectional view, the maximum angle θmax, the minimum angle θmin, the second largest angle θ, and the second smallest angle θ are arranged around the axial line in this order.

11. The rotating tool according to claim 1,
wherein a layout line of a plurality of cutting inserts arranged along a predetermined chip discharge groove among the plurality of chip discharge grooves is set to a fixed lead between the cutting inserts disposed after at least the second stage.

12. The rotating tool according to claim 2,
wherein in at least the cross-sectional view in which the first stage cutting inserts are shown and the cross-sectional view in which the second stage cutting inserts are shown, all the plurality of angles θ formed around the axial line are different from each other.

13. The rotating tool according to claim 2,
wherein in the cross-sectional view, the cutting inserts of three or more stages including one angle θmax, one angle θmin, and two or more angles θ other than the angle θmax and the angle θmin are provided in the direction of the axial line.

14. The rotating tool according to claim 2,
wherein the maximum angle θmax (angle θmax) among the plurality of angles θ (angle θ1) formed around the axial line in the cross-sectional view in which the first stage cutting inserts are shown and the maximum angle θmax (angle θmax) among the plurality of angles θ (angle θ2) formed around the axial line in the cross-sectional view in which the second stage cutting inserts are shown are disposed between the chip discharge grooves adjacent to each other in the circumferential direction.

15. The rotating tool according to claim 2,
wherein the minimum angle θmin (angle θ1min) among the plurality of angles θ (angle θ1) formed around the axial line in the cross-sectional view in which the first stage cutting inserts are shown and the minimum angle θmin (angle θ2min) among the plurality of angles θ (angle θ2) formed around the axial line in the cross-sectional view in which the second stage cutting inserts are shown are disposed between the chip discharge grooves adjacent to each other in the circumferential direction.

16. The rotating tool according to claim 2,
wherein in the cross-sectional view, the maximum angle θmax and the minimum angle θmin among the plurality of angles θ formed around the axial line are disposed to be adjacent to each other in the circumferential direction.

17. The rotating tool according to claim 2,
wherein in the cross-sectional view, the minimum angle θmin and a second smallest angle θ are respectively disposed to be adjacent to both sides of the maximum angle θmax in the circumferential direction among the plurality of angles θ formed around the axial line.

18. The rotating tool according to claim 2,
wherein in the cross-sectional view, the maximum angle θmax and a second largest angle θ are respectively disposed to be adjacent to both sides of the minimum angle θmin in the circumferential direction among the plurality of angles θ formed around the axial line.

19. The rotating tool according to claim 2,
wherein in the cross-sectional view, the maximum angle θmax, the minimum angle θmin, the second largest angle θ, and the second smallest angle θ are arranged around the axial line in this order.

20. The rotating tool according to claim 2,
wherein a layout line of a plurality of cutting inserts arranged along a predetermined chip discharge groove among the plurality of chip discharge grooves is set to a fixed lead between the cutting inserts disposed after at least the second stage.

* * * * *